March 31, 1959     A. M. LIPPISCH     2,879,957
FLUID SUSTAINED AIRCRAFT

Filed Aug. 2, 1954     2 Sheets-Sheet 1

INVENTOR.
ALEXANDER M. LIPPISCH
BY
ATTORNEY

March 31, 1959  A. M. LIPPISCH  2,879,957
FLUID SUSTAINED AIRCRAFT
Filed Aug. 2, 1954  2 Sheets-Sheet 2

INVENTOR.
ALEXANDER M. LIPPISCH
BY
ATTORNEY

United States Patent Office 2,879,957
Patented Mar. 31, 1959

2,879,957

FLUID SUSTAINED AIRCRAFT

Alexander Martin Lippisch, Cedar Rapids, Iowa, assignor to Collins Radio Company, Cedar Rapids, Iowa, a corporation of Iowa Application August 2, 1954, Serial No. 447,046

2 Claims. (Cl. 244—23)

This invention relates to a wingless aircraft composed of a fuselage in which shrouded propellers or propulsion means are arranged so as to obtain very efficient operation.

It is pointed out in my prior co-pending application entitled "Aircraft," Serial Number 325,567, filed December 12, 1952, now U.S. Patent No. 2,734,699, that one of the inherent disadvantages of conventional aircraft is that they require a long wing to obtain sufficient lift at low speeds. Such long wings have tremendous drag, thus, greatly increasing the power required to maintain the aircraft in flight. Also, the wing must be moved through the air at a relatively high rate of speed to obtain sufficient lift. This requires that landings and take-offs be made at relatively high speeds, as for example, 100 miles per hour. Many dangers are inherent at these high speeds close to the ground. Thus, the vertical velocity is small but the large horizontal velocity creates a hazard.

Another feature of the present invention is to provide tail supporting booms on either side of the fuselage which are formed as airfoil sections so that when air from the propeller is deflected downwardly between them suction will occur, pulling air down from above the booms, thus, creating greater lift on the craft.

Further features, objects and advantages will become apparent from the following description and claims when read in view of the drawings, in which:

Figure 1:
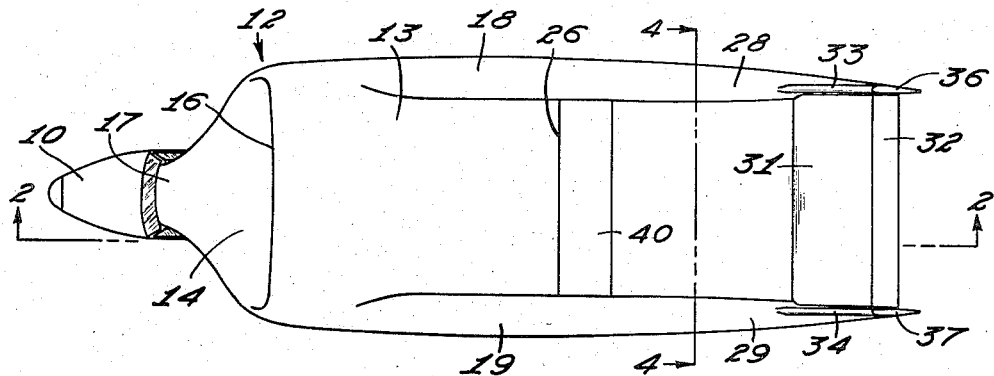
Figure 1 is a top view of an aircraft according to my invention.

Referring now to the drawings, Figures 1, 2, 3, and 4 illustrate an aircraft which has a main body portion 10 that has ground supporting wheels 11 that may be retracted.

It is an object of the present invention to provide an aircraft with a ducted propeller mounted on a substantially horizontal axis and with control surfaces mounted behind the propeller, and with flaps mounted on the end of these control surfaces so as to deflect the air from the propellers downwardly or rearwardly as desired. In take-offs and landings the control surfaces will be so positioned that the air will be deflected substantially downward, thus, creating a lift upwardly and with very little forward component so that the aircraft can move vertically. This allows very low landing speeds and requires very small areas for landing. The body portion 10 may carry the pilot and passengers and all cargo.

Figure 2:
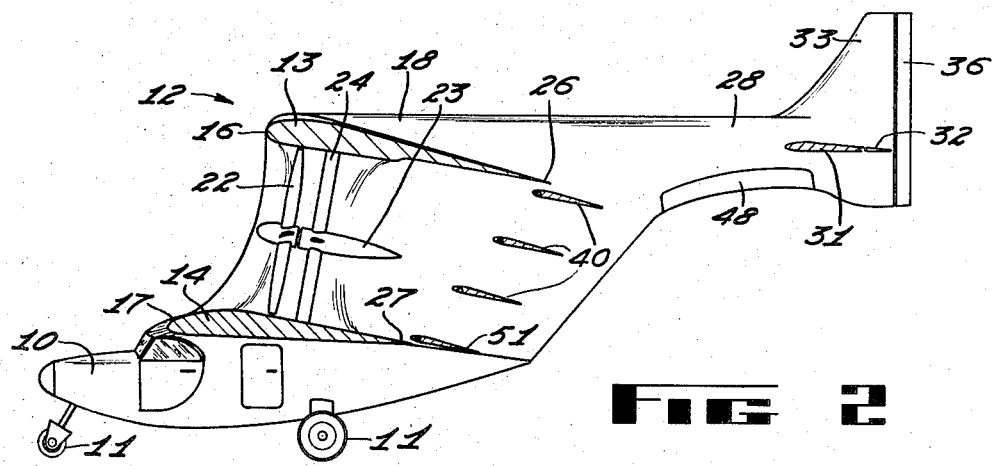
Figure 2 is a sectional view taken on line 2—2 of Figure 1.
Figure 3:
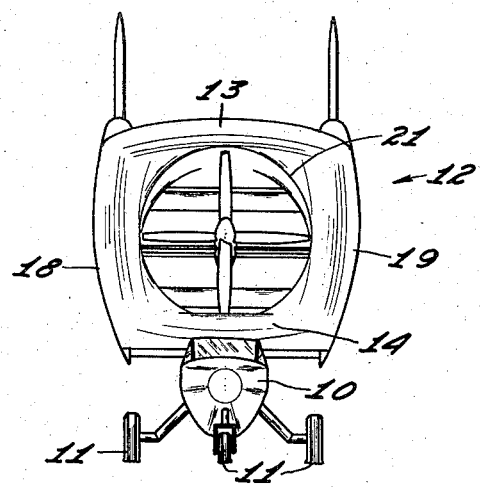
Figure 3 is a front view of an aircraft according to my invention.

Extending upwardly from the body portion 10 is a lift and propulsion generating portion designated generally as 12 which comprises an upper lift producing portion 13 and a lower lift portion 14. It is to be noted that the leading edge 16 of the upper lift producing portion 13 is substantially rearward from the leading edge 17 of the lower lift portion 14. This is best seen in Figure 2.

Side portions 18 and 19 join the upper and lower portions 13 and 14 and a duct 21 passes through the center of the lift and propulsion portion 12. The members 13, 14, 18 and 19 form an air scoop so as to direct air through the duct 21.

A propeller 22 is mounted on the output shaft of a suitable driving means 23 which is supported by struts 24 mounted within the duct 21. The upper and lower portions 13 and 14 are formed as airfoil sections and comprise transitions from substantially horizontal sections to circular sections.

The rear portions 26 and 27 of the portions 13 and 14, respectively, change again from the circular shape to substantially horizontal sections. For example, Figure 1 illustrates that the top of member 13 is substantially flat; whereas the underside of member 13 goes from a substantially horizontal portion adjacent the leading edge 16 to a curved portion adjacent the propeller 22 to a substantially horizontal section rearwardly of the propeller.

The sides 18 and 19 extend rearwardly from the trailing edge 26 and 27 to form booms 28 and 29. The rear portions of the booms 28 and 29, respectively, support a horizontal stabilizer 31 which might have an elevator 32 attached to its trailing edge, and vertical fins 33 and 34 are mounted respectively to the booms 28 and 29 and carry rudders 36 and 37, respectively.

Figure 4:
Figure 4 is a sectional view taken on line 4—4 of Figure 1.

As shown in Figure 4, the booms 18 and 19 are formed as airfoil sections for a purpose to be later described.

Mounted rearwardly of the propeller 22 and adjacent the trailing edges 26 and 27 are a plurality of control surfaces 40 which are supported by the sides 18 and 19. These control surfaces are pivotally supported and may be moved from a substantially horizontal to a substantially vertical position so as to deflect the air moving through the ducted propeller downwardly or rearwardly.

Figure 5:
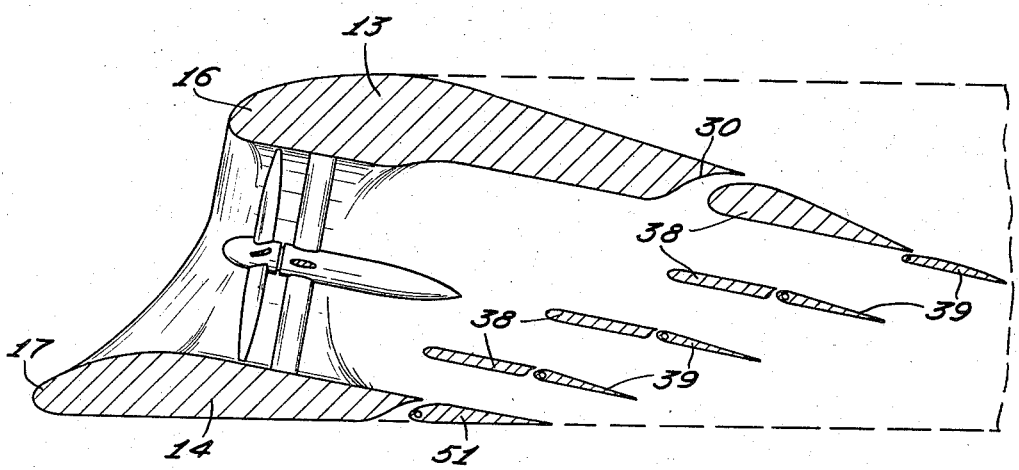
Figure 5 is an enlarged sectional view of a modification of my invention.

Figure 5 illustrates a modification of the invention wherein fixed airfoil surfaces 38 have flaps 39 attached to their rear edges so as to obtain an articulated action. A slot 30 is formed through the upper portion 13.

Figure 6:
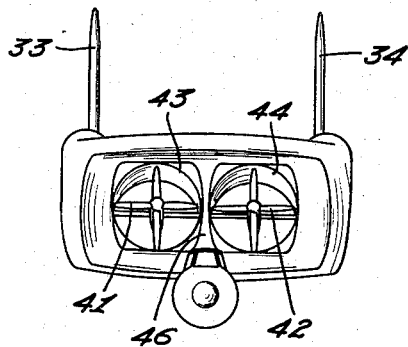
Figure 6 is a front view of a modification where twin shroud propellers are utilized instead of one.

Figure 6 illustrates a modification wherein a pair of propellers 41 and 42 are mounted in a pair of ducts 43 and 44, respectively, with a center separating partition 46 between the ducts. This makes the lift producing and thrust producing portion wider and lower. However, it is to be realized that the basic principles apply to both structures. Further modifications which may be easily made comprise mounting a pair of propellers within each duct. Also, a single driving means may be geared to both the propellers.

When we investigate the properties of a shrouded propeller in forward flight attitude we find that the best transport economy of such an arrangement is obtained if the axis of the shroud is in a nearly horizontal position. Therefore, if we use a combination of shrouded propellers composed into a body for the design of an aircraft with a high degree of transport economy, that is an aircraft which carries a large load per horsepower over a wide range, we have to install the ducted propellers in an almost horizontal position. If we then want to fly at low speed or to hover without any forward speed, the stream of air going through the ducted propellers must be deflected downward under such an angle that, for instance, for the hovering condition this exhausting air has a vertical downward direction.

It was proposed to turn the aircraft as a whole so that you could hover with an almost vertical position of the shroud and fly forward in a nearly horizontal position, but when we think of an application for larger aircraft where cargo and passengers have to be transported, such maneuvers cannot be used. We must, then, solve the problem in such a way that the longitudinal axis of the aircraft has no more change in inclination than conventional aircraft will have, which is at the maximum in the range of 20° to 30° inclination. Therefore, if we arrange the shroud axis or the outlet of the shroud so that in a normal position of the aircraft the exhausting stream will have an inclination of around 10° downward for normal flight attitude, and if we consider that for hovering or very low speed flight we would raise the angle of incidence of the whole aircraft to about 20°, then we have to deflect the outgoing stream to 60° to get a straight downward flow.

On the other hand, we will find that the cross-section of the accelerated air exhausting out of the diffuser of the shrouds should be a large cross-section for hovering with reasonable power, while the cross-section for forward flight with best speed can be considerably smaller. The deflection of the stream has to be accomplished in such a way that the cross-section of the exhausting stream is enlarged.

Since in a hovering condition there is no outer flow which would stabilize the flight of the aircraft, there must be a means of controlling the position of the aircraft in hovering flight by controlling the direction of the exhausting stream toward the aircraft. Therefore, it is necessary to arrange certain combinations of vanes in the exit so that the deflection of such vanes controls the direction of the exhausting stream. This can be accomplished by the control members 38 and flaps 39. It is to be remembered, as shown in Figure 4, that side beams 18 and 19 are formed as airfoil sections. This is because experimental results and theoretical calculations have proved that side beams of such shape give increase in lift as well as performance. This may be explained as follows:

The stream which goes through the propellers was increased in its total head since the power of the engines was transmitted into this stream by the action of the propellers. When this energized air leaves the body it stays together like a solid beam for some distance behind the exit. Since this stream would have a backward and downward direction, the surrounding air will follow the direction of the stream to fill out the space above the stream. This means that in the region of the trailing edge of the upper surface of the shroud the exhausting stream creates a low pressure area, causing the outer air to flow towards this area. On a simple shroud without any side walls this action will lead to the formation of strong vortices similar to the tip vortices of a wing. If we put side walls on such a shroud arrangement, the rotational motion of the outer air will keep a low pressure field on the upper surface of the side walls, producing a considerable amount of additional lift.

On the other hand, we will avoid the formation of those vortices almost completely. We will have, therefore, not only the advantage of inducing additional lift from the flow through the shroud, but also saving the loss of the rotational energy in those vortices, usually known as induced drag.

In a larger aircraft carrying cargo and passengers, the space within these side beams can be used for carrying passengers, as well as cargo. The fuselage as shown in Figure 6 is, for instance, arranged between the lower parts of the shrouds and is centered. The fuselage extends forward to carry the pilots and other members of the crew, as well as passengers in the rooms behind the cockpit. The corresponding space between the upper part of the shrouds may be used for the engine compartment or as space for fuel tanks, etc. Otherwise, the engine compartment could be arranged at the rear of the fuselage, and cargo or passengers in the upper room. Thus, the engine could be remotely located from the propeller and geared to it.

As we have said, the control of the aircraft in forward flight is accomplished by the control areas at the end of the tail booms. This provides control in pitch and in yaw. The rolling motion of the aircraft can be controlled by using the left and right hand sides of the cascade vanes 38 as ailerons being turned in opposite directions to each other. Such roll control will be a combined roll and yaw control if these vanes are deflected at a larger angle downward. In the low speed flight condition, flaps 48 and 49, which are located along the lower edges of the side booms 28 and 29, can be used for roll and yaw flaps. The yawing motion of the aircraft can also be controlled by adjusting the pitch of the propellers.

The cascade vanes 38 at the end of the diffuser box consist chiefly of a row of fixed wing-shaped surfaces which may have a flap 39 at their trailing edges. Favorably, there will be a slot between the fixed surface and the flap which opens when the flaps are deflected downward, so that a breakdown of the flow over the upper surface of the flaps can be prevented. These cascade vanes will also serve as a straightener to extinguish the rotation of the slipstream coming from the propellers and will, in this way, increase the performance of the system.

For full downward deflection the trailing edge of the lower surface of the diffuser box will also have a flap 51 which may be turned downwards, and since there is no air to come through a slot from underneath in a hovering position, there can be arranged suction or blowing over this part of the surface to prevent stalling at large angles of deflection. This can also be done in such a way that the cascade vanes 38 above this surface are located at a smaller distance to have the effect of a guide vane when large deflections are used. For increased efficiency of the cascade system, boundary layer control can be used on all upper surfaces, if necessary.

Since we have a considerable amount of low pressure right in front of the propellers, especially in hovering conditions, these surfaces can be connected with suction slots in front of the propellers to achieve boundary layer control by suction on the cascade surfaces. If such an arrangement cannot be used favorably due to technical difficulties, a separate suction or blower system can be arranged connected directly with the power unit so that in a low speed flight attitude and in hovering conditions suction or blowing over the highly loaded cascade surfaces can be used.

We see from all these examples that we can use many favorable methods for obtaining the highest possible efficiency of this system, since we have enclosed the flow which produces lift and propulsion within the body and are able to control it at any point necessary. The structural weight of such aircraft will be considerably lower than that of conventional aircraft due to the fact that this is a compact ring-bound structure with large cross-sections at each point so that no local concentration of forces and moments has to be handled. These gains in structural weight can be used either to install more power than usually necessary so that the safety of the aircraft is improved, or to increase the range or load-carrying capacity of the aircraft.

The undercarriage of the aircraft may consist of a more or less conventional three-wheel type to be retracted in flight. Since the landing speed of such aircraft is very low, or there is no forward speed at all, the weight of the undercarriage will also be considerably decreased.

Another advantage which might be mentioned here is that since we have no far-extended wing span such aircraft will need less hangar space for storage.

In operation the vanes 38 and flaps 39 and 51 are placed in the down position and the motor is started. The propeller will produce air flow through the diffuser section which will be deflected downwardly by the flaps and vanes. The mass of air deflected downwardly will cause a reaction against the aircraft which will cause it to rise from the ground. As explained above, air will be sucked through the opening between the booms 28 and 29 and will create additional lift. The opening between the booms 28 and 29 is best seen in Figure 2. After the aircraft has reached a sufficient altitude vanes 38 and flaps 39 and 51 may be moved toward the horizontal, thus causing the deflection of the air to be rearwardly, giving a forward component of velocity to the aircraft.

The aircraft is capable of moving through the air at high velocities due to the low drag resulting from the small cross-sectional area. When a landing is to be made, the craft may be slowed down by pitching upwardly and by deflecting the vanes 38 and the flaps 39 and 51 downwardly until the air flow is once again downward. As the power is reduced the aircraft will be controlled so as to hover and lose altitude.

It is seen that this invention provides a craft capable of extremely high speeds with a high degree of safety due to its low-speed landing and take-off characteristics.

Although this invention has been described with respect to particular embodiments thereof, it is not to be so limited as changes and modifications may be made therein which are within the full intended scope of the invention as defined by the appended claims.

I claim:

1. A wingless aircraft comprising, a main body portion, a lift and propulsion generating portion attached to the top of main body portion, said lift and propulsion generating portion formed with a central duct, the leading edge of the upper part of said lift-producing portion substantially rearward of the leading edge of the lower lift-producing portion, a propeller rotatably supported within said duct, a driving means attached to said propeller, a plurality of vanes supported rearwardly of said duct, a first plurality of flaps pivotally attached to the rear of said vanes on axes transverse to said central duct for control of lift, a pair of booms having airfoil sections and extending rearwardly from the lift and propulsion generating portion, and a second plurality of flaps pivotally supported on longitudinal axes to the lower portions of said booms.

2. A wingless aircraft capable of taking off and landing substantially vertical comprising a main body portion, a lift and propulsion generating portion attached to said body portion, said lift and propulsion generating portion having upper and lower lift-producing portions with the leading edge of the lower portion being substantially forwardly of the leading edge of the upper portion, a pair of side portions having airfoil sections and extending rearwardly from either side of said lift and propulsion generating portion, part of said upper, lower and side portions forming a duct means, propeller means mounted in said duct means, driving means attached to said propeller means, a plurality of first control surfaces attached to said lift and propulsion generating portion rearwardly of said propeller means, a plurality of second control surfaces attached to the rear ends of said side portion, and a plurality of third control surfaces attached to said side portions and pivotally supported thereby on longitudinal axes.

References Cited in the file of this patent

UNITED STATES PATENTS

| | | |
|---|---|---|
| 1,564,718 | Sewell | Dec. 8, 1925 |
| 1,690,773 | Donaldson | Nov. 6, 1928 |
| 1,864,912 | Johnson | June 28, 1932 |
| 1,910,098 | Ellis | May 23, 1933 |
| 2,384,893 | Crook | Sept. 18, 1945 |
| 2,476,482 | Custer | July 19, 1949 |
| 2,665,083 | Custer | Jan. 5, 1954 |

FOREIGN PATENTS

| | | |
|---|---|---|
| 558,943 | France | June 5, 1943 |
| 893,866 | France | Feb. 28, 1944 |
| 1,037,666 | France | May 6, 1953 |